Jan. 19, 1971  F. MOTTIER  3,556,660
ARRANGEMENT FOR INTERFEROMETRIC MEASUREMENT OF A PLURALITY
OF LENGTHS WITH MONOCHROMATIC LIGHT BEAMS
Filed Dec. 24, 1968
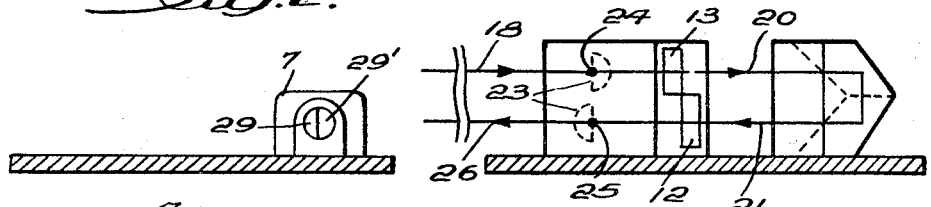
Fig. 2.
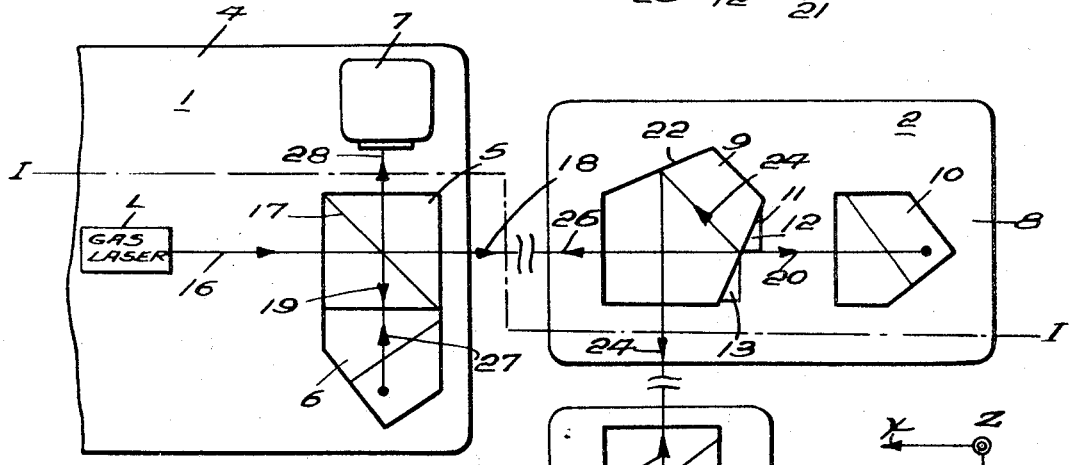
Fig. 1.
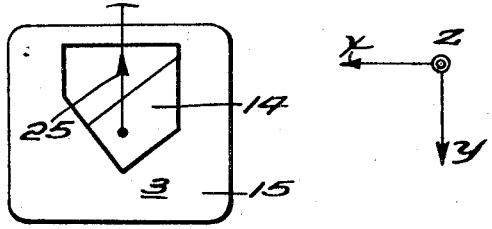
Fig. 3.
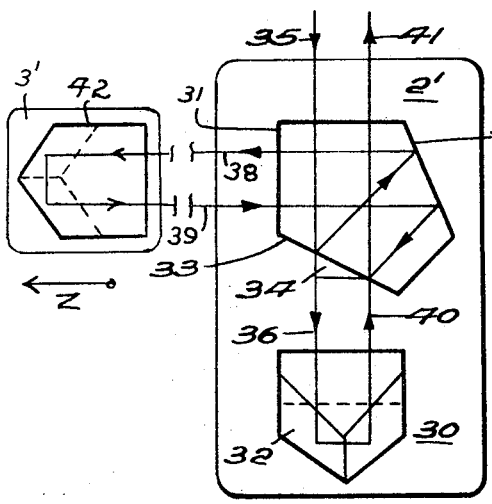
Fig. 4.
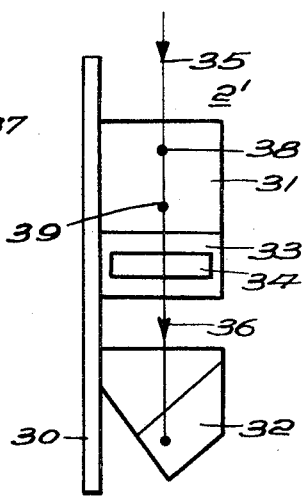
INVENTOR
Francois Mottier
BY Pierce, Schiffler & Parker
ATTORNEYS United States Patent Office
3,556,660
Patented Jan. 19, 1971

1

3,556,660
ARRANGEMENT FOR INTERFEROMETRIC MEASUREMENT OF A PLURALITY OF LENGTHS WITH MONOCHROMATIC LIGHT BEAMS
François Mottier, Zurich, Switzerland, assignor to Aktiengesellschaft Brown, Boveri & Cie, Baden, Switzerland, a joint-stock company
Filed Dec. 24, 1968, Ser. No. 786,575
Claims priority, application Switzerland, Jan. 25, 1968, 1,191/68
Int. Cl. G01b 9/02
U.S. Cl. 356—106                       3 Claims

ABSTRACT OF THE DISCLOSURE

An arrangement for simultaneous interferometric measurement of a plurality of lengths utilizes a single monochromatic circular light beam which is divided up by intensity in a first optical divider into an outgoing reference beam and an outgoing measurement beam. The outgoing measurement beam is further divided by intensity in a second optical divider after traversing one of the lengths to be measured into outgoing two partial measurement beams each having a semicircular cross-section. One of the partial measurement beams is reversed in direction and returned to the second optical divider after traversing the second length to be measured where it is recombined with the other partial measurement beam which has also been reversed in direction and returned. The recombined measurement beam is then returned to the first optical divider where it combines with the outgoing reference beam following the latter's reversal and return to form an outgoing light beam which is differently intensity modulated over the two halves of its cross-section, and these two halves are admitted respectively to photo-detectors which measure their intensity.

---

The invention relates to an arrangement for the simultaneous interferometric measurement of a plurality of lengths by means of monochromatic light beams which are divided up by intensity in divider arrangements into reference and measuring beams, and wherein the returning measuring and reference beams are recombined in the same divider arrangements in order to form intensity-modulated light-beams.

In the field of precision length-measurement, interferometric methods of measurement have found numerous new fileds of application to an increasing extent since the discovery of the laser principle. One of these fields of application is, for example, the calibration and testing of traverse-measuring devices for machine tools. This involves among other things the problem of measuring simultaneously, and with a high degree of accuracy, lengths which correspond, for example, to two or more dimensions of co-ordinate control. Now in order to solve this problem it is possible to use a separate laser interferometer for each length-measurement. In view of the high cost of a laser interferometer, this solution is relatively expensive.

It is a principal object of the invention to provide an improved arrangement for the simultaneous interferometric measurement of a plurality of lengths which, while exhibiting equally high accuracy, answer the purpose with considerably less expenditure than were a separate laser interferometer to be used for each length-measurement.

The invention is characterized in that only one measuring beam and one reference beam are formed in a first divider arrangement, in that the outgoing measuring beam is split up on at least one further divider arrangement in each case into at least two partial measuring beams whereof at least one in each case traverse a measurement distance in a loop and has a cross-section equal in each case to one partial cross-section of the measuring beam, in that the returning partial measuring beams are in each case combined, on the same further divider arrangement on which the outgoing beams are split up, to form the returning measuring beam which forms in the first divider arrangement, together with the returning reference beam, a light beam which is differently intensity-modulated in a plurality of partial cross-sections, and in that the intensities corresponding to the individual partial cross-sections are detected.

The invention will be explained in detail hereinafter by reference to various embodiments and the accompanying drawings wherein:

FIG. 1 illustrates, in plan one embodiment for measuring two co-ordinates $x$, $y$;

FIG. 2 shows a section thereof in elevation along the line I—I in FIG. 1, and

FIGS. 3 and 4 are views in plan and side elevation respetcively of a second embodiment which enables three co-ordinates to be measured simultaneously.

With reference now to FIGS. 1 and 2, the measuring device consists of a fixed unit 1 and two units 2 and 3 movable with respect thereto in the $x$ direction. Of these movable units 2, 3, one unit 3 is for its part furthermore movable in the $y$ direction relatively to the other unit 2. The fixed unit 1 comprises, mounted on a base plate 4, a beam splitter cube 5 with an adjoining corner cube prism 6 and a photo-detector unit 7 in the second unit 2, a pentaprism 9 and a corner cube prism 10 are arranged sequentially in the $x$ direction on a base plate 8. Two prisms 12, 13 are cemented, one on to each of two non-adjacent quadrants of the first reflecting plane 11 of the said pentaprism 9. The third unit 3 consists essentially of a corner cube prism 14 on a base plate 15.

For the purposes of the following description of the manner in which the device operates, the light-beams are indicated in the figure by their axes or paths in the form of numbered lines provided with directional arrows.

A gas laser L, which may be mounted on the base plate 4 of the fixed unit 1, generates a monochromatic coherent light-beam 16 of circular cross-section and very small angular divergence which beam enters the beam splitter cube 5 and is divided up by intensity in the divider plane 17 of the said cube into an outgoing measuring beam 18 and an outgoing reference beam 19.

The measuring beam 18 traverses the measurement distance of the $x$ co-ordinate, enters the pentaprism 9 of the unit 2, and is here divided up on the first reflecting plane 11 into two partial measuring beams. Part of the measuring beam 18 emerges substantially unaltered from the pentaprism 9 in the form of the first partial measuring beam 20 through the surface occupied by the cemented-on prism 13. This first partial measuring meam 20 impinges on the corner cube prism 10, in which its direction is reversed, and passes back to the pentaprism 9 via the cemented-on prism 12 as the returning first partial measuring beam 21. The other half of the measuring beam 18, which does not encounter by way of its associated partial cross-section any cemented-on prism on the first reflecting plane 11, is reflected on the latter, and after further reflection on the plane 22 emerges from the pentaprism 9 as the second partial measuring beam 24 with a semicircular cross-section 23. This second outgoing partial measuring beam 24 traverses the measurement distance of the $y$ co-ordinate, undergoes a reversal of direction in the corner cube 14 of the unit 3, and passes as the returning second partial measuring beam 25 back to the pentaprism 9.

After reflection on the planes 22 and 11, this returning second partial measuring beam 25 combines on the plane 11 with the returning first partial measuring beam 21 entering the pentaprism 9 through the cemented-on prism 12 to form a returning measuring beam 26. This returning measuring beam 26, which is thus formed over half its cross-section by the returning partial measuring beam 21, and over half its cross-section by the returning measuring beam 25, traverses the measurement distance of the $x$ co-ordinate back to the unit 1, and combines in the divider plane 17 of the divider cube 5 with the reference beam 27 returning from the corner cube prism 6 to form a light-beam 28 which is differently intensity-modulated over the two halves of its cross-section, and which illuminates input windows 29 and 29' corresponding to these cross-sections on the photo-detector unit 7. The modulated half-beams received by these input windows 29, 29' are each fed to a photo-detector device in the photo-detector unit 7.

As will easily be realized, that half of the light-beam 28 which is received via the input window 29 is intensity-modulated in accordance with the variation in the $x$ co-ordinate, and the other half received via the input window 29' is intensity modulated in accordance with the variation in the sum $(x+y)$ of the coordinates, so that a sinusoidal intensity-variation corresponding to a full cycle is detected by the associated photo-detector devices per variation in length of the magnitude of a half-wavelength of the laser light. In order to determine the sense or direction of the variation in length, the phase of the modulation is also detected besides the intensity value, which moreover is the principle in the case of all interferometric length-measuring devices. For this purpose, in the given example a wedge-shaped coating is vapour-deposited on the corner cube prism 6 in the path of the rays of the reference beam 19, 27, for example, at the junction with the divider cube 5, which coating has a maximum height amounting to only a few wavelengths of the laser light, and shears the wavefronts of the reference beam 19, 20 and those of the modulated light-beam 28. Each of the photo-detector devices incorporated in the photo-detector unit 7 consists of a pair of photo-detectors whereof the input slots are disposed on a common plane which is illuminated by the associated half-beam. The said input slots are parallel to these intensity maxima, and are mutually offset in a direction perpendicular to the extent of the slot by a quarter of the distance between two such neighboring maxima. The sign of the variation in length is determined in a phase-discriminator from the phase of the signals from the two photo-detectors, and the direction of counting of an associated bi-directional counter is controlled in accordance with this sign, the signal pulses delivered by one of the photo-detectors and corresponding to the intensity maxima being counted with the correct sign in the said counter.

In the device described, variations in the state of one counter are thus proportional to variations in the $x$ co-ordinate, and those of the other counter are proportional to variations in the sum $(x+y)$ of the co-ordinates.

A second embodiment of the invention, enabling three co-ordinates to be simultaneously measured, will now be described with reference to FIGS. 3 and 4.

This embodiment differs essentially from the device for measuring two co-ordinates according to FIGS. 1 and 2 only in that instead of the unit 3 (FIG. 1) there are two units 2' and 3' capable of being moved in the $y$ direction relatively to the unit 2, the unit 3' being for its part movable in the $z$ direction relatively to the unit 2'. The unit 2', which is illustrated in FIGS. 3 and 4 in plan view and elevation respectively, comprises a pentaprism 31 and a corner cube prism 32 mounted sequentially in the $y$ direction on a base plate 30. The pentaprism 31 has a prism 34 cemented on to it over a middle region of its first reflecting plane 33. The unit 3', which is movable relatively to the unit 2' in the $z$ direction, includes a corner cube prism 42 for returning the partial measuring beam 38 as a partial beam 39 after traversing the $z$ direction.

This second variant of the device acts in the following manner:

The outgoing measuring beam is split up into a first and a second outgoing partial measuring beam in the same manner as in the first variant. The partial measuring beam proceeding in the $y$ direction from the pentaprism of the unit 2 traverses the measurement distance of the $y$ co-ordinate and passes, now being called the partial measuring beam 35 in accordance with FIGS. 3 and 4, to the pentaprism 31 in the unit 2', where it is split up into a third and a fourth partial measuring beam. This dividing up takes place analogously to that in the pentaprism 9 of the unit 2, so that half of the second partial measuring beam 35 emerges substantially unaltered as the third partial measuring beam 36 from the pentaprism 31 over that half of the cross-section of the incoming partial measuring beam which is covered by the cemented-on prism 34, while its other half is reflected on the first reflecting plane 33, and after further reflection on the plane 37 of the pentaprism 31 is radiated in the $z$ direction as the fourth partial measuring beam 38. This outgoing fourth partial beam 38 traverses the measurement distance of the $z$ co-ordinate, undergoes a reversal of direction on the corner cube prism of the unit 3', and passes as the returning fourth partial beam 39 back to the pentaprism 31, and after reflection on the plane 37 to the first reflecting plane 33. The outgoing third partial beam 36 is reversed in the triple prism 32 and becomes the returning third partial beam 40, which combines with the fourth returning partial beam 39 reflected on the first reflecting plane 33 of the pentaprism 31 to form the returning second partial beam 41. This returning second partial beam 41 traverses the measurement distance of the $y$ co-ordinate to the pentaprism of the unit 2, and is thence combined in the same manner as in the first variant with the returning first partial measuring beam to form the returning measuring beam, which for its part forms in the divider cube of the unit 1, together with the returning reference beam, a light beam which is differently intensity-modulated in three partial cross-sections. This light beam illuminates the input windows of a photo-detector unit, which as opposed to the photo-detector unit 7 in the first variant has not two but three input windows, corresponding to the said three partial cross-sections, via each of which an associated photo-detector device with two photo-detectors is illuminated as in the case of the first variant. The photo-detector signals are evaluated by bi-directional counters analogously to the first variant.

I claim:

1. In an arrangement for simultaneous interferometric measurement of a plurality of lengths, the combination comprising means producing a monochromatic light beam of circular cross section, a first beam divider into which said light beam is directed and which produces an outgoing circular reference beam and an outgoing circular measurement beam, a second beam divider into which said outgoing circular measurement beam is directed after traversing a first one of said lengths, said second beam divider including means thereon which divide said circular measurement beam into two outgoing partial measurement beams each having a semi-circular cross-section, means for reversing the direction of one of said partial measurement beams and returning the same to said second beam divider, means for reversing the direction of the other of said partial measurement beams and returning the same to said second beam divider after traversing a second one of said lengths to be measured, said returning semi-circular partial measurement beams being combined in said second beam divider to again form a circular beam and returned to said first beam divider as a returning measurement beam after again traversing said first length, means for reversing the direction of said outgoing reference beam and returning the same to said first beam divider, said returning measurement beam and said returning reference beam being combined in said first beam divider to form an outgoing light beam which is differently intensity modulated over the two halves of its cross section, and photo-detector means receiving respectively the two halves of said outgoing modulated light beam for measuring the intensity thereof.

2. An arrangement as defined in claim 1 for simultaneous interferometric measurement of a plurality of lengths wherein said first beam divider is constituted by a divider cube, wherein said second beam divider is constituted by a pentaprism to which two other prisms are attached, each said other prism causing the portion of the circular beam impinging thereon to be transmitted therethrough as a partial beam having a semi-circular cross-section and wherein said means for reversing the direction of said outgoing reference beam and said outgoing partial measurement beams are constituted by corner cube prisms.

3. An arrangement as defined in claim 2 for simultaneous interferometric measurement of a plurality of lengths and which further includes a second pentaprism receiving said other of said partial measurement beams after traversing said second one of said lengths to be measured and which serves to divide the same into two other partial measurement beams.

References Cited
UNITED STATES PATENTS

| | | | |
|---|---|---|---|
| 2,977,841 | 4/1961 | Kaufmann | 356—106X |
| 3,225,644 | 12/1965 | Schuch | 356—113 |
| 3,434,787 | 3/1969 | Chitayat | 356—106 |

RONALD L. WIBERT, Primary Examiner

T. MAJOR, Assistant Examiner

U.S. Cl. X.R.

350—287